US009781737B2

(12) United States Patent
Su et al.

(10) Patent No.: US 9,781,737 B2
(45) Date of Patent: *Oct. 3, 2017

(54) APPARATUS AND METHODS FOR NETWORK ASSISTED HYBRID NETWORK OPERATION

(71) Applicant: Apple Inc., Cupertino, CA (US)

(72) Inventors: Li Su, San Jose, CA (US); Madhusudan Chaudhary, Sunnyvale, CA (US); Jianxiong Shi, Pleasanton, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/685,537

(22) Filed: Apr. 13, 2015

(65) Prior Publication Data

US 2015/0289286 A1    Oct. 8, 2015

Related U.S. Application Data

(63) Continuation of application No. 13/475,802, filed on May 18, 2012, now Pat. No. 9,008,033.
(Continued)

(51) Int. Cl.
*H04W 72/12* (2009.01)
*H04J 13/00* (2011.01)
(Continued)

(52) U.S. Cl.
CPC ......... *H04W 72/1242* (2013.01); *H04J 13/00* (2013.01); *H04W 24/10* (2013.01);
(Continued)

(58) Field of Classification Search
None
See application file for complete search history.

(56) References Cited

U.S. PATENT DOCUMENTS 6,545,996 B1 * 4/2003 Falco ............... H04W 72/1242
370/347
6,996,745 B1    2/2006 Shaylor
(Continued)

FOREIGN PATENT DOCUMENTS

CN    101521935 A    9/2009
EP    0415515 A2    3/1991
(Continued)

OTHER PUBLICATIONS

Japanese Patent Application No. 2015-180052—Office Action dated Aug. 29, 2016.
(Continued)

*Primary Examiner* — Candal Elpenord
(74) *Attorney, Agent, or Firm* — Downey Brand LLP

(57) ABSTRACT

Methods and apparatus for minimizing scheduling collisions between networks. In one embodiment, the networks are substantially unsynchronized, and during hybrid network operation (e.g., LTE and CDMA 1X operation), a mobile device can place CDMA 1X voice calls while registered with the LTE network. However, since the LTE and CDMA 1X networks are not coordinated, the mobile device will experience scheduling collisions. In one variant, the LTE network accounts for predictable behaviors (such as CDMA 1X paging), and schedules low priority tasks during likely time interval conflicts. Consequently, even though the mobile device must tune away from the LTE network to check CDMA 1X pages, overall LTE network performance is minimally affected.

20 Claims, 5 Drawing Sheets

Related U.S. Application Data

(60) Provisional application No. 61/488,620, filed on May 20, 2011, provisional application No. 61/598,815, filed on Feb. 14, 2012, provisional application No. 61/599,313, filed on Feb. 15, 2012.

(51) Int. Cl.
  H04W 68/00 (2009.01)
  H04W 24/10 (2009.01)
  H04W 76/06 (2009.01)
  H04W 72/10 (2009.01)

(52) U.S. Cl.
  CPC ..... *H04W 68/005* (2013.01); *H04W 72/1215* (2013.01); *H04W 72/1247* (2013.01); *H04W 76/064* (2013.01); *H04W 72/10* (2013.01); *H04W 72/12* (2013.01)

(56) References Cited

U.S. PATENT DOCUMENTS

| | | |
|---|---|---|
| 7,439,895 B1 | 10/2008 | Widdowson |
| 7,772,933 B1 | 8/2010 | Nicholls |
| 7,915,962 B2 | 3/2011 | Nicholls et al. |
| 7,929,962 B2 | 4/2011 | Bachl et al. |
| 8,134,992 B1 | 3/2012 | Nam et al. |
| 8,270,972 B2 | 9/2012 | Otting et al. |
| 8,326,341 B2 | 12/2012 | Hugl et al. |
| 8,331,256 B2 | 12/2012 | Lee et al. |
| 8,412,190 B1 | 4/2013 | Moisanen et al. |
| 8,565,109 B1 | 10/2013 | Poovendran et al. |
| 8,687,608 B2 | 4/2014 | Soliman |
| 8,717,929 B2 * | 5/2014 | Smith ................ H04W 72/10 370/252 |
| 8,745,260 B2 * | 6/2014 | Harrang ............. H04L 1/0002 370/232 |
| 8,774,131 B1 * | 7/2014 | Singh ................ H04W 48/18 370/236 |
| 9,009,320 B2 | 4/2015 | Shi et al. |
| 9,591,614 B2 | 3/2017 | Shi et al. |
| 2002/0136184 A1 | 9/2002 | Liang et al. |
| 2003/0181216 A1 | 9/2003 | Tsai et al. |
| 2003/0214914 A1 | 11/2003 | Cain |
| 2007/0149206 A1 | 6/2007 | Wang et al. |
| 2007/0254598 A1 | 11/2007 | Bachl et al. |
| 2008/0220766 A1 | 9/2008 | Bertho et al. |
| 2009/0180451 A1 | 7/2009 | Alpert et al. |
| 2009/0215472 A1 | 8/2009 | Hsu |
| 2009/0215473 A1 * | 8/2009 | Hsu ................... G06K 19/0701 455/458 |
| 2009/0279483 A1 | 11/2009 | Falchuk et al. |
| 2009/0318183 A1 | 12/2009 | Hugl et al. |
| 2010/0017861 A1 | 1/2010 | Krishnaswamy et al. |
| 2010/0021648 A1 | 1/2010 | Ota |
| 2010/0061321 A1 | 3/2010 | Calvanese Strinati et al. |
| 2010/0113010 A1 | 5/2010 | Tenny et al. |
| 2010/0135257 A1 | 6/2010 | Higuchi et al. |
| 2010/0202307 A1 | 8/2010 | Lee et al. |
| 2010/0216468 A1 | 8/2010 | Kazmi et al. |
| 2010/0234042 A1 | 9/2010 | Chan et al. |
| 2010/0279637 A1 | 11/2010 | Umatt |
| 2010/0291925 A1 | 11/2010 | Nagata et al. |
| 2010/0317357 A1 | 12/2010 | Miki et al. |
| 2011/0001567 A1 | 1/2011 | Nicholls et al. |
| 2011/0007696 A1 | 1/2011 | Dayal et al. |
| 2011/0007856 A1 | 1/2011 | Jang et al. |
| 2011/0072101 A1 | 3/2011 | Forssell et al. |
| 2011/0085498 A1 | 4/2011 | Oba et al. |
| 2011/0096706 A1 | 4/2011 | Ramasamy et al. |
| 2011/0143753 A1 | 6/2011 | Rahman et al. |
| 2011/0151874 A1 | 6/2011 | Olsson et al. |
| 2011/0151924 A1 | 6/2011 | Miller |
| 2011/0182221 A1 | 7/2011 | Arakawa |
| 2011/0201347 A1 | 8/2011 | Abraham et al. |
| 2011/0228750 A1 | 9/2011 | Tomici et al. |
| 2011/0244869 A1 | 10/2011 | Olofsson |
| 2012/0034910 A1 | 2/2012 | Fang et al. |
| 2012/0044910 A1 | 2/2012 | Maeda et al. |
| 2012/0057457 A1 | 3/2012 | Ahmadi |
| 2012/0069823 A1 | 3/2012 | Low et al. |
| 2012/0135737 A1 | 5/2012 | Yoshihara et al. |
| 2012/0202549 A1 | 8/2012 | Eriksson et al. |
| 2012/0213161 A1 | 8/2012 | Maeda et al. |
| 2012/0230303 A1 | 9/2012 | Guo et al. |
| 2012/0231802 A1 | 9/2012 | Ngai |
| 2012/0297070 A1 | 11/2012 | Shi et al. |
| 2012/0300686 A1 | 11/2012 | Maeda et al. |
| 2012/0307715 A1 | 12/2012 | Maeda et al. |
| 2014/0056275 A1 | 2/2014 | Behnamfar et al. |
| 2015/0296483 A1 | 10/2015 | Shi et al. |

FOREIGN PATENT DOCUMENTS

| | | |
|---|---|---|
| JP | H03174632 A | 7/1991 |
| JP | 2010050961 A | 3/2010 |
| JP | 2012527194 A | 11/2012 |
| JP | 2013502188 A | 1/2013 |
| JP | 2013509100 A | 3/2013 |
| WO | 2009090684 A1 | 7/2009 |
| WO | 2010121168 A1 | 10/2010 |
| WO | 2010132710 A1 | 11/2010 |
| WO | 2011020110 A1 | 2/2011 |
| WO | 2011022570 A1 | 2/2011 |
| WO | 2011046477 A1 | 4/2011 |
| WO | 2011050195 A1 | 4/2011 |
| WO | 2011056252 A1 | 5/2011 |
| WO | 2011056254 A1 | 5/2011 |

OTHER PUBLICATIONS

Chinese Patent Application No. 201210245491.7—Office Action dated Apr. 10, 2015.
Chinese Patent Application No. 201210245491.7—Office Action dated Jun. 5, 2014.
Japanese Patent Application No. 2014-511604—Office Action dated Nov. 10, 2014.
Chinese Patent Application No. 201210245521.4—Office Action dated Jun. 30, 2014.
Japanese Patent Application No. 2014-511606—Office Action dated Nov. 10, 2014.
Korean Patent Application No. 10-2013-0733956—Office Action dated Jan. 16, 2015.
Taiwanese Patent Application No. 104120612—Office Action dated Dec. 7, 2016.
PCT Patent Application No. PCT/US2012/038717—International Search Report and Written Opinion dated Sep. 17, 2012.
PCT Patent Application No. PCT/US2012/038715—International Search Report and Written Opining dated Oct. 10, 2012.
Japanese Patent Application No. 2015-228046—Office Action dated Sep. 16, 2016.
Chinese Patent Application No. 201210245521.4—Office Action dated Jan. 23, 2015.
Chinese Patent Application No. 201210245491.7—Office Action dated Oct. 26, 2015.

* cited by examiner

APPARATUS AND METHODS FOR NETWORK ASSISTED HYBRID NETWORK OPERATION

CROSS-REFERENCE TO RELATED APPLICATIONS

This application is a continuation of U.S. application Ser. No. 13/475,802, filed May 18, 2012, entitled "APPARATUS AND METHODS FOR NETWORK ASSISTED HYBRID NETWORK OPERATION," which claims the benefit of U.S. Provisional Application No. 61/488,620, filed May 20, 2011, entitled "APPARATUS AND METHODS FOR NETWORK ASSISTED HYBRID NETWORK OPERATION," U.S. Provisional Application No. 61/598,815, filed Feb. 14, 2012, entitled "APPARATUS AND METHODS FOR NETWORK ASSISTED HYBRID NETWORK OPERATION," and U.S. Provisional Application No. 61/599,313, filed Feb. 15, 2012, entitled "APPARATUS AND METHODS FOR NETWORK ASSISTED HYBRID NETWORK OPERATION," the contents of which are incorporated herein by reference in their entirety for all purposes.

This application is related to U.S. application Ser. No. 13/475,482, filed on May 18, 2012, entitled "APPARATUS AND METHODS FOR CLIENT SERVER INTERACTION IN HYBRID NETWORK ENVIRONMENTS," U.S. application Ser. No. 13/475,802, filed on May 18, 2012, entitled "APPARATUS AND METHODS FOR OPTIMIZING SCHEDULED OPERATIONS IN HYBRID NETWORK ENVIRONMENTS," U.S. Provisional Application No. 61/478,922, filed Apr. 25, 2011, entitled "DUAL NETWORK MOBILE DEVICE RADIO RESOURCE MANAGEMENT," U.S. application Ser. No. 13/099,204, filed May 2, 2011, now U.S. Pat. No. 8,688,160, issued on Apr. 1, 2014, entitled "SINGLE-RADIO DEVICE SUPPORTING COEXISTENCE BETWEEN MULTIPLE RADIO ACCESS TECHNOLOGIES," U.S. Provisional Application No. 61/472,617, filed Apr. 6, 2011, entitled "MULTIPLE NETWORK MOBILE DEVICE CONNECTION MANAGEMENT," U.S. Provisional Application No. 61/433,160, filed Jan. 14, 2011, entitled "DYNAMIC LOADING IN DEVICES WITH MULTIPLE ANTENNAS," and U.S. Provisional Application No. 61/433,162, filed Jan. 14, 2011, entitled "MULTIMODE USER EQUIPMENT WITH DUAL CIRCUIT ARCHITECTURE," each of the foregoing being incorporated herein by reference in its entirety.

FIELD

The present invention relates generally to operation within heterogeneous wireless systems such as, for example, hybrid network operation in which client devices can communicate using any one of several networks. More particularly, in one exemplary aspect, the present invention is directed to methods and apparatus for a network to minimize scheduling collisions with another network (e.g., one that is substantially unsynchronized with the first network).

BACKGROUND

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary ease, a hybrid device can support both: (i) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, while a mobile device is attached to a first LTE network, it must periodically "tune out" the LTE network to perform CDMA 1X actions (such as decoding the Quick Paging Channel (QPCH) to determine if the device is being paged). If the mobile device is receiving data from the LTE network during the tune out period, this data is lost. Furthermore, a tuned out mobile device will miss any broadcasted updated network resource information or control data, this can result in the mobile device being barred from access to the LTE network (at least for a period of time).

Consequently, improved methods and apparatus are needed to minimize scheduling collisions for mobile devices.

SUMMARY

The present invention satisfies the aforementioned needs by providing, inter alia, improved apparatus and methods for minimizing scheduling collisions between networks.

In one aspect of the present invention, a wireless apparatus for minimizing collisions between networks is disclosed. In one embodiment, the wireless apparatus includes one or more network interfaces, a processor in data communication with the one or more network interfaces, and a storage device in data communication with the processor, the storage device comprising computer-executable instructions.

In one variant, the computer-executable instructions are configured to, when executed, identify a client device operative within the first network, determine one or more time slots during which the identified client device is likely to be scheduled for tasks of a first priority within a second network, and schedule a task having a second priority to be performed by the client device within the first network so as to occur during the determined one or more time slots.

In a second variant, the first priority is of a higher priority than the second priority.

In a third variant, the determination is based at least in part on information derived from an identifier received from the client device.

In a fourth variant, the determination is further based at least in part on timing information common to the first and second networks.

In a second aspect of the invention, a client device capable of hybrid network operation is disclosed. In one embodiment, the device includes a processor, at least two wireless interfaces in data communication with the processor, a storage device in data communication with the processor, the store device comprising computer-executable instructions.

In one variant, the computer-executable instructions are configured to, when executed, register to a first network using the a first wireless interface of the at least two wireless interfaces, determine a first schedule for receiving one or more communications from the first network based on a first identifier, register with a second network using a second wireless interface of the at least two wireless interfaces, provide the first identifier to the second network, and receive a second schedule determined by the second network based at least in part on the first identifier.

In a third aspect of the present invention, a method for minimizing collisions between networks is disclosed. In one embodiment, the method includes identifying a client device operative within a first network, determining one or more time intervals during which the identified client device may be scheduled high priority tasks within a second network, and scheduling a low priority task within the first network during the determined one or more time intervals.

In a fourth aspect of the invention, a computer-readable storage apparatus is disclosed. In one embodiment, the apparatus includes a storage medium having at least one computer program stored thereon, the at least one program being configured to, when executed, identify a client device, determine one or more time intervals during which the identified client device may be scheduled high priority tasks within another network, and/or schedule a low priority task during the determined one or more time intervals.

In a fifth aspect of the invention, a hybrid network system is disclosed. In one embodiment, the system comprises at least two networks, and at least one network of the hybrid network system prioritizes one or more of its tasks based on high priority tasks of one or more others of the at least two networks.

In a sixth aspect of the invention, a network is disclosed. In one embodiment, the network prioritizes one or more of its tasks based on designated tasks of one or more other networks.

Other features and advantages of the present invention will immediately be recognized by persons of ordinary skill in the art with reference to the attached drawings and detailed description of exemplary embodiments as given below.

DETAILED DESCRIPTION

Reference is now made to the drawings, wherein like numerals refer to like parts throughout.

Overview

In one aspect, the present invention provides methods and apparatus for minimizing scheduling collisions between e.g., two or more unsynchronized networks. In one embodiment, a first network allocates certain time intervals for "low priority" tasks, based on the likelihood of a "high priority" task for another network occurring during these time intervals. Since only low priority tasks are scheduled for a client device during the allocated time intervals, performance is minimally affected when the client device tunes out of the first network to communicate with the other network(s). In one exemplary implementation, the first network is not notified when the client device tunes out to interact with another network. In fact, the first network may be entirely unaware of the client device's connection status to other networks, which advantageously simplifies operation, and obviates any infrastructure changes to the network(s).

The user equipment (UE) device can, e.g., tune out of a first network (e.g., an LTE network) in order to check paging channel messages of a second network (CDMA 1X network). The LTE network schedules radio monitoring tasks (e.g., a measurement gap) during CDMA 1X paging channel operation. Consequently, when the mobile device tunes to the CDMA 1X paging channel, there is no activity for the mobile device on the LTE network. After checking the paging channel, the mobile device can return to the LTE network, having only missed a low priority task. In the event of a received page, the mobile device may respond to the page, and let the LTE network connection time out.

Moreover, various aspects of the present invention can be applied to other networks, and other types predictable network traffic. More generally, various aspects of the present invention can be adapted to improved scheduling of tasks, to greatly reduce scheduling conflicts in multiple network environments.

DETAILED DESCRIPTION OF EXEMPLARY EMBODIMENTS

Exemplary embodiments and aspects of the present invention are now described in detail. While these embodiments and aspects are primarily discussed in the context of Long Term Evolution (LTE), Code Division Multiple Access 1X (CDMA 1X) cellular networks, and CDMA 1XEVDO (Evolution Data Optimized), it will be recognized by those of ordinary skill that the present invention is not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various aspects of the invention are useful in combination with any network (cellular, wireless, wireline, or otherwise) that can benefit from intelligent scheduling to minimize scheduling conflicts with other networks.

LTE/CDMA 1X Hybrid Network Operation

Figure 1:
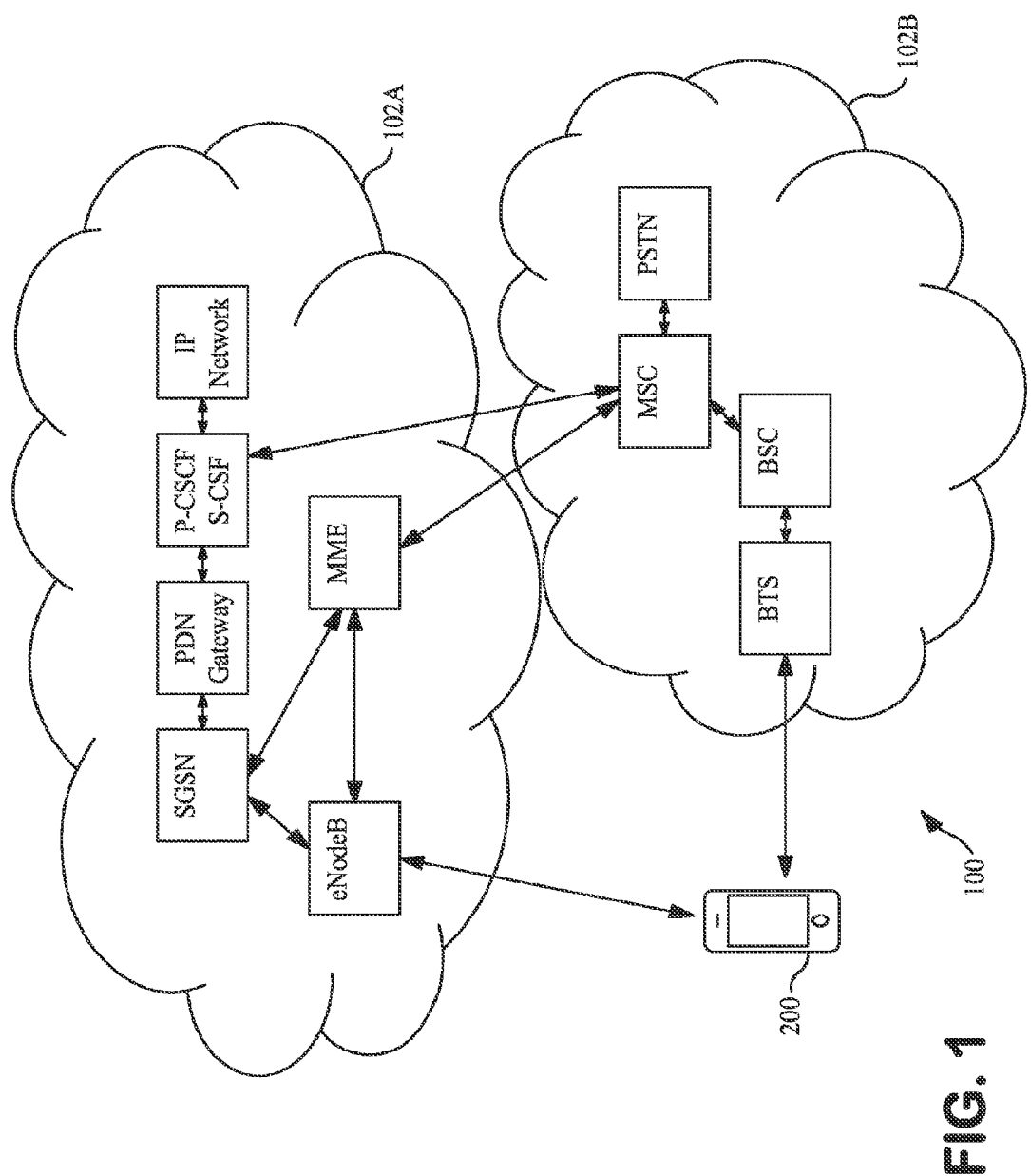
FIG. 1 is a logical block diagram illustrating one exemplary hybrid network system useful in conjunction with the present invention.

FIG. 1 illustrates an exemplary hybrid network system 100. The exemplary hybrid network comprises a first LTE RAN (radio access network) 102A and a second CDMA 1XRAN 102B in communication with a user equipment (UE) client device 200. As shown in FIG. 1, the LTE RAN and CDMA 1XRAN are unsynchronized, and entirely unaware of the other RAN's operation. In other scenarios, the RANs may have higher levels of coordination; e.g., the RANs may be loosely synchronized, or even tightly synchronized in certain aspects of their operation.

Figure 2:
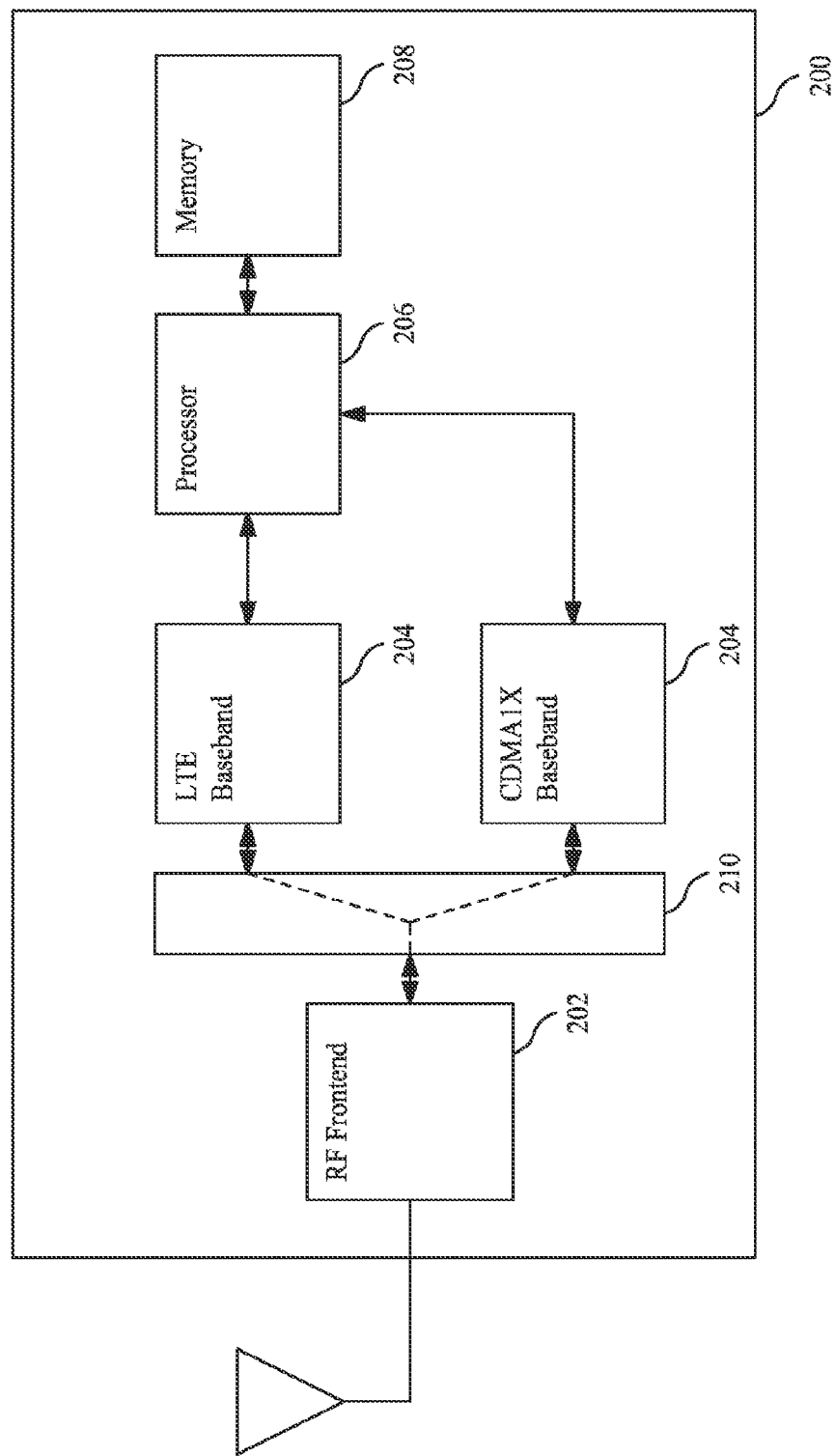
FIG. 2 is a functional block diagram of an exemplary embodiment of a user equipment (UE) apparatus configured according to the present invention.

Referring now to FIG. 2, the exemplary user equipment (UE) apparatus 200 is illustrated in greater detail. The UE includes: (i) one or more Radio Frequency (RF) front-ends 202, (ii) one or more baseband processors 204, and (iii) at least one application processor 206 and associated memor(ies) 208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present invention.

Additionally, in one exemplary embodiment of the present invention, the UE 200 further comprises a switching fabric 210 that can connect any one (or more) of the baseband processors 204 to various one (or more) of the antennas 202. The illustrated switching fabric is adapted to connect either the LTE baseband or CDMA IX baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 200, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.)

Furthermore, it should be recognized that the UE depicted in FIG. 2 is merely illustrative of one exemplary embodiment. Still other variants useful with the present invention are described with greater detail in U.S. Provisional Application No. 61/478,922, filed Apr. 25, 2011, entitled "DUAL NETWORK MOBILE DEVICE RADIO RESOURCE MANAGEMENT," U.S. application Ser. No. 13/099,204, filed May 2, 2011, now U.S. Pat. No. 8,688,160, issued on Apr. 1, 2014, entitled "SINGLE-RADIO DEVICE SUPPORTING COEXISTENCE BETWEEN MULTIPLE RADIO ACCESS TECHNOLOGIES," U.S. Provisional Application No. 61/472,617, filed Apr. 6, 2011, entitled "MULTIPLE NETWORK MOBILE DEVICE CONNECTION MANAGEMENT," U.S. Provisional Application No. 61/433,160, filed Jan. 14, 2011, entitled "DYNAMIC LOADING IN DEVICES WITH MULTIPLE ANTENNAS," and U.S. Provisional Application No. 61/433,162 filed Jan. 14, 2011, entitled "MULTIMODE USER EQUIPMENT WITH DUAL CIRCUIT ARCHITECTURE," each of the foregoing being incorporated herein by reference in its entirety.

The exemplary UE 200 of FIG. 2 is capable of LTE/CDMA 1X hybrid mode operation within, e.g., the hybrid network system of FIG. 1. Specifically, the UE 200 can place CDMA 1X voice calls while registered with the LTE network. During hybrid operation, the UE can be registered to both a LTE network 102A and a CDMA 1X network 102B. The UE is capable of receiving and responding to data and control messaging from either the LTE network or the CDMA 1X network; however, as previously discussed, the UE cannot respond simultaneously to both networks, and always prioritizes CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, etc.)

Specifically, once the UE 200 has connected to the LTE network 102A, the UE will periodically tune its radio away from the LTE network to perform CDMA 1X maintenance actions such as acquiring a CDMA 1X cell, registering to the acquired CDMA 1X cell, and receiving CDMA 1X pages, etc. Depending on CDMA 1X network 102B radio conditions, these actions can range in one exemplary implementation from eighty milliseconds (80 ms) up to several seconds (4 s-6 s). Moreover, when the UE receives or places a voice call on the CDMA 1X network, the LTE connection may be dropped.

Within this context, certain types of network maintenance are predictable, and can be scheduled around. Careful scheduling of LTE tasks can greatly reduce scheduling conflicts with CDMA IX communications. For example, CDMA 1X has a very predictable paging mechanism. Since the UE must tune away from the LTE network to check CDMA 1X pages, the LTE network can predictively increase hybrid network performance by ensuring that CDMA 1X paging channel operation overlaps with low priority (or no priority) tasks.

TD-LTE/TD-SCDMA Network Operation

As is understood in the art, Time-Division Long-Term Evolution (TD-LTE) also known as Long-Term Evolution Time-Division Duplex (LTE TDD) is similar to Frequency Division (FD)-LTE. In the case of Frequency Division Duplex, the downlink and uplink are transmitted using different frequencies. In Time Division Duplex, the downlink and the uplink are on the same frequency and the separation occurs in the time domain, so that each direction in a call is assigned to specific timeslots. Similarly, Time Division Synchronous Code Division Multiple Access (TD-SCDMA) allows traffic to be uplinked (from the mobile terminal to the base station) and downlinked (from the base station to the mobile terminal) using different time slots in the same frame. Embodiments of the present invention contemplate the use of these technologies together and separately (in combination with other technologies) in a hybrid network such as by implementing the methodology described herein with respect to FIG. 3 (except using one or more different combinations of radio access technologies set forth herein).

In an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

TD-LTE/GSM Network Operation

As is understood in the art, Global System for Mobile Communications (GSM) is a cellular technology standard and has evolved a number of advancements including General Packet Radio Service (CPRS), Enhanced Data rates for GSM Evolution (EDGE), and Universal Mobile Telecommunications System (UMTS) also known as 3G (Third Generation) UMTS.

In an exemplary embodiment relating to both TD-LTE and GSM, a UE connected to the TD-LTE network will periodically (or on an event driven or other basis) tune its radio away from the TD-LTE network to perform GSM actions such as cell selection, registration, and receiving pages.

Methods

Figure 3:
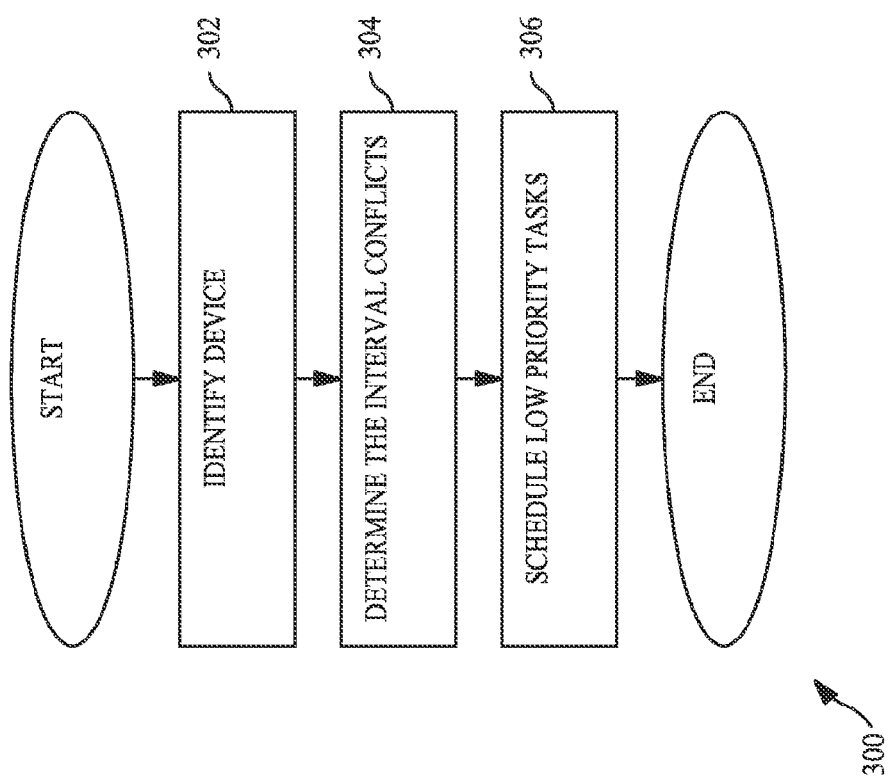
FIG. 3 is a logical flow diagram detailing one embodiment of a generalized method for minimizing scheduling collisions between unsynchronized networks, in accordance with the present invention.

Referring now to FIG. 3, one embodiment of a generalized method 300 for minimizing scheduling collisions with another unsynchronized network is illustrated. In one scenario, a client device is connected to a first network, where the first network is entirely unaware of the client device's connections to other networks. Alternatively, the first network may have limited information on nearby networks (e.g., timing information, registered devices, etc.) which may be periodically refreshed, but is not integrated within the operational decisions for the first network. Still other network scenarios may tightly integrate the first network and the other networks, but still require intelligent management of conflicting schedules to minimize collisions (e.g., where the networks share information such as location area updates, paging information, etc.). For example, even where a first LTE network is tightly coupled to a second CDMA 1X network, the LTE network must intelligently schedule its device accesses around the CDMA 1X network schedule, and vice versa.

At step 302 of the method 300, a client device is identified. In one embodiment, the client device is identified with an identifier which is unique across all networks. For example, in one exemplary embodiment, a mobile device is identified with an International Mobile Subscriber Identity (IMSI) which is unique for all mobile devices across all networks. In alternate embodiments, the client device is identified with an identifier which is unique for at least one network. For example, the device may be assigned a temporary identifier which may not be unique across all other networks, but which uniquely identifies the device for at least one network (e.g., common examples include e.g., network addresses, service set identifiers (SSIDs), etc.).

It will also be appreciated that while recited as an affirmative step, step 302 described above may in fact be integrated or performed intrinsically with other steps or operations For example, when the method 300 is implemented, a device (and in fact one or more of the relevant networks) may already know the identifier of the device, such as by virtue of authentication of the device to the network for access to services.

At step 304, a first network determines one or more time intervals during which the identified client device may be scheduled for "high priority" tasks within one or more other networks. As used herein, the term "high priority" is used to broadly include without limitation any number of different tasks, operations, or requirements associated with the operation of the device within the network, or with the network itself. The priority may be based on, e.g., tasks or operations: (i) necessary to keep the client device or UE in communication with the network, (ii) necessary to support temporally sensitive or periodic operations (e.g., to meet timing or QoS requirements for streaming media, emergency calls, important update broadcasts or beacons, etc.), and/or (iii) to support user-specified preferences or requirements (e.g., "Always prioritize X over Y" or the like).

Additionally, while a "high priority/low priority" (i.e., two-state) hierarchy of tasks is described with respect to the exemplary embodiments, it will be appreciated that any number of other schemes may be employed, such as a linear scale of priority (e.g., 1-10) with one or more thresholds for varying types of actions, an "always/never" scheme (e.g., where some actions or tasks are always prioritized, and others are never prioritized), etc.

Moreover, as used herein, the term "network" may include e.g., any managerial entity within the network which has been enabled to practice the various aspects of the present invention. For example, such entities may include base stations (e.g., NodeB, enhanced NodeB (eNB), etc.), Radio Network Controllers (RNC), etc.

In one exemplary embodiment, the first network and one or more other networks derive their time base from the same time reference. For example, while the LTE base stations and CDMA 1X base stations do not share the same time base and are not synchronized with one another, both networks derive their time base from the Global Positioning System (GPS) time reference. Accordingly, the LTE and CDMA 1X time bases will not drift in reference to one another. Therefore, CDMA IX time can be calculated as a function of LTE time, and vice versa. Other examples of derived time references include those derived from power line alternating current (AC) frequencies (i.e., 60 Hz within the United States of America, 50 Hz elsewhere), or time references derived from a common signaling reference, etc.

Alternately, the first network and one or more other networks may be loosely synchronized. For example, while networks may not be constantly synchronized, they may exchange time information on a periodic/aperiodic basis (e.g., time stamps, time references, time pulses, etc.) to minimize time drift. Time reference adjustments are inherent to tightly coupled networks, and not discussed further.

Moreover, it is further recognized that alternate embodiments of the invention may determine one or more time intervals during which the identified client device may be scheduled to perform low priority tasks within one or more other networks. In these alternate embodiments, scheduled low priority tasks within other networks are ideal for scheduling high priority data transfers within the first network.

As described in greater detail hereinafter (see Example Operation), in one exemplary LTE/CDMA 1X hybrid environment, a mobile phone must check certain time slots of the Quick Paging Channel (QPCH), based on its International Mobile Subscriber Identity (IMSI). If the mobile phone has an incoming page on the QPCH, the mobile must additionally decode the Forward Common Control Channel (F-CCCH)/Forward Paging Channel (F-PCH) that immediately follows the QPCH. Accordingly, an LTE network eNodeB determines one or more of its own time intervals that overlap the estimated CDMA 1XQPCH time intervals (and subsequent F-CCCH/F-PCH decode) for the mobile device.

In addition to paging channel reception, it is further appreciated that various aspects of the present invention are usable with any predictable event (i.e., whenever it is of generally high likelihood that the identified device will be tuned away from the first network). Common examples of predictable events include periodic reception or transmission events (e.g., periodic broadcast channels, periodic updates, pilot channels, etc.), and deterministic events (e.g., receiving a location area update may be related to another network's updates, based on client device notification, etc.).

At step 306 of the method 300, the first network schedules low priority tasks for the identified client device during the determined time intervals. In one embodiment, the low priority tasks can be entirely preempted or ignored. Alternately, the low priority tasks can tolerate frequent interruption and/or failure.

Since in the exemplary embodiment, only low priority tasks are scheduled for the client device during the determined time intervals, performance is minimally affected by the client device tuning out to check other networks. In one implementation, the client device is not required to notify the first network when it is tuning out to interact with another network. Instead, the client device can tune out of the first network, perform its required actions within the other network(s), and return without interruption to the first network. For example, the client device can tune out of the LTE network, check the QPCH of the CDMA 1X network, and if there is no page, the device can return to normal LTE operation having only missed a low priority task. In the event of a received page, the mobile device may respond to the page, and let the LTE network connection eventually time out.

Alternately, in some embodiments, the mobile device may respond to the page, and notify the first network to allow the first network to terminate its connection "gracefully" (i.e., without abrupt loss of connectivity or service).

In some embodiments, low priority tasks do not involve an active data exchange between the client device and the first network. Alternatively, low priority tasks may include transfer of non-critical information, small amounts of data, redundant data, or may otherwise be configured to tolerate lossy behavior (e.g., robust forward error correction, retransmission schemes, etc.). Common examples of low priority tasks include radio monitoring (e.g., cell selection/cell re-selection procedures), low priority messaging (e.g., location updates, periodic performance data, etc.), time insensitive data transmissions, etc.

Example Operation

Figure 4:
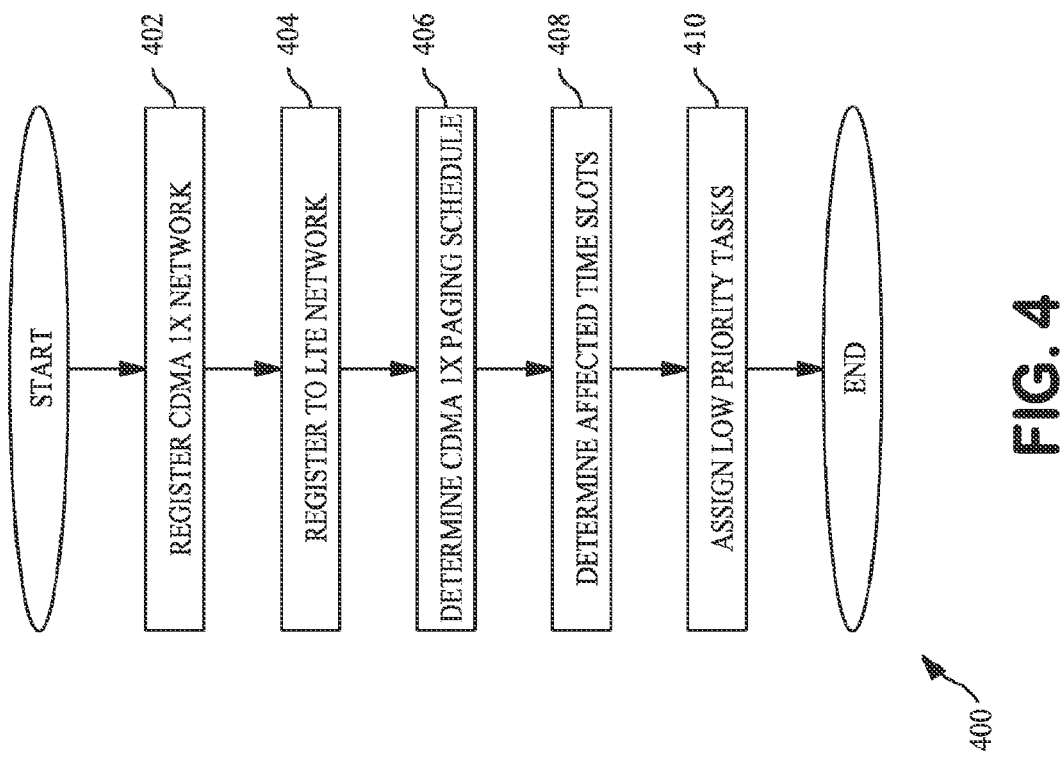
FIG. 4 is a logical flow diagram detailing one exemplary implementation of the method of FIG. 3 in the context of Long Term Evolution network and a Code Division Multiple Access 1X networks.

Referring now to FIG. 4, one exemplary implementation of the method 300 of FIG. 3 is shown and described, specifically in the context of minimizing scheduling collisions between a Long Term Evolution (LTE) network and Code Division Multiple Access 1X (CDMA 1X) network.

At step 402 of the method 400, the user equipment (UE) 200 registers with the CDMA IX network 102B, During CDMA 1X registration, the UE identifies itself to the CDMA IX network with its unique International Mobile Subscriber Identity (IMSI). Various aspects of CDMA 1X operation are defined by the UE's IMSI. For example, in CDMA IX networks, mobile devices operate in so-called "slotted mode" paging operation. During slotted mode operation, a mobile device monitors the paging channel according to assigned slots (rather than checking every slot).

Within CDMA IX networks 102B, the Quick Paging Channel (QPCH) is an un-coded, spread, and On-Off-Keying modulated spread spectrum signal. It is divided into eighty millisecond (80 ms) time slots. The UE 200 is assigned a QPCH slot that starts one hundred milliseconds (100 ms) before its assigned paging slot. The paging slot (PG_SLOT) is computed with a hashing function based on the UE's IMSI. The CDMA IX hashing function ensures that paging for a population of mobile stations is evenly distributed across a number of paging resources.

The following hash function is specific to CDMA 1X, and other cellular technologies implement a wide range of different hash functions differently (and for other purposes). Hence, it will be appreciated that the following is provided merely for illustrative purposes, and the invention is in no way limited to this or any other particular hash or cryptographic functions.

CDMA 1X Hashing Function

In CDMA 1X networks 102B, there are 2048 paging slots numbered from 0 to 2047 that span the maximum slot cycle length of 163.84 seconds. The hash function is deterministic and based on a hash key (HASH_KEY) which is derived from the mobile device or user equipment (UE) IMSI. The paging slot is determined according to the following equation:

$$PG\_SLOT=FLOOR[N\times(40503\times(L \text{ XOR } H \text{ XOR } DECORR))\text{modulo } 2^{16})/2^{16}],$$

where:
HASH_KEY=the 32 least significant bits of $IMSI\_O\_S1+2^{24}\times IMSI\_O\_S2$;
L=the 16 least significant bits of HASH_KEY;
H=the 16 most significant bits of HASH_KEY;
N=2048; and
DECORR=6×the twelve least significant bits of HASH_KEY.

Once the mobile device has determined an appropriate paging slot, the mobile device indicates (and regularly updates) a preferred slot cycle with the CDMA 1X network via e.g., registration messages, origination messages, and/or paging response messages. The combination of the mobile device's IMSI and negotiated parameters with the CDMA 1X network defines a paging scheme.

The mobile device will monitor pages via the forward paging channel (F-PCH) at the start of the slot in which a SLOT_NUM (which is based on system time) equals PG_SLOT (which is based on the mobile device's IMSI). The QPCH precedes the F-PCH by 100 ms, and can be used to determine if the mobile device should decode the F-PCH, or if the F-PCH can be ignored. The SLOT_NUM is given by the equation:

SLOT_NUM=FLOOR[$t$/4]modulo 2048, where:
t=system time (in frames).
Specifically, each mobile device can be paged with the F-PCH when the following equation is true:

(FLOOR[($t$+5)/4]−PG_SLOT)modulo(16×$T$)=0, where:
$T=2^i$; and
where:
i=a SLOT_CYCLE_INDEX that is specified by the mobile device.

The mobile device monitors one bit of the QPCH per slot to determine whether it needs to look for an incoming page; if the bit is one (1), then the mobile device will decode the regularly assigned F-CCCH/F-PCH slot that immediately follows the QPCH. Otherwise, if the bit is zero (0), the mobile device can ignore the current paging cycle, and can return to sleep (or tune back to another network).

Referring back to FIG. 4, at step 404, the user equipment (UE) 200 registers to the LTE network 102A. The LTE network in this embodiment does not share any registration information with the CDMA 1X network 102B, and is unaware of the UE's registration status with the CDMA 1X network. However, the LTE network can determine both: (i) UE's paging schedule within the CDMA 1X network based on the UE's IMSI, and (ii) the CDMA 1X system time based on the a common GPS time reference. In fact, it is of note that the LTE network and the CDMA 1X network advantageously do not have to exchange any information with one another, and may not even be aware of one another, for operation of the present embodiment of the invention.

At step 406, the LTE network 102A determines the UE's 200 paging schedule within the CDMA 1X network 102B. In one embodiment, the LTE network calculates the UE's paging schedule based on the UE's IMSI (see CDMA 1X Hashing Function, supra). The UE's paging schedule is the same regardless of the CDMA 1X network with which it is registered.

Moreover, it is appreciated that paging schemes for other network technologies are also relatively simple to describe, thus a mobile device's paging schedule can be easily determined with relatively little information for other network technologies (e.g., by querying the device itself, its attached network, etc.).

At step 408 of the method 400, the LTE network 102A determines one or more affected time slots, based on the UE's 200 paging schedule. The LTE network converts the CDMA 1X time slots to corresponding LTE time slots based on a transform. Since both LTE networks 102A and CDMA 1X networks 102B derive their time references from the same Global Positioning System (GPS) time reference, the CDMA 1X and LTE time references will not drift with respect to one another.

At step 410, the LTE network 102A schedules one or more low priority tasks for the UE during the determined time periods. Since only low priority tasks overlap any possible CDMA 1X network maintenance, the LTE network will be minimally affected (if at all) when the UE 200 tunes away from the LTE network. In this example, the LTE network configures a measurement gap for the UE to measure inter-frequency or inter-RAT (Radio Access Technology) cell quality. Even though measurement gap is allocated to the UE for inter frequency and inter-RAT cell detection and measurement, the UE can use this time to tune out and monitor the CDMA 1X paging indicators in the CDMA Quick Paging Channel (QPCH).

Apparatus

Figure 5:
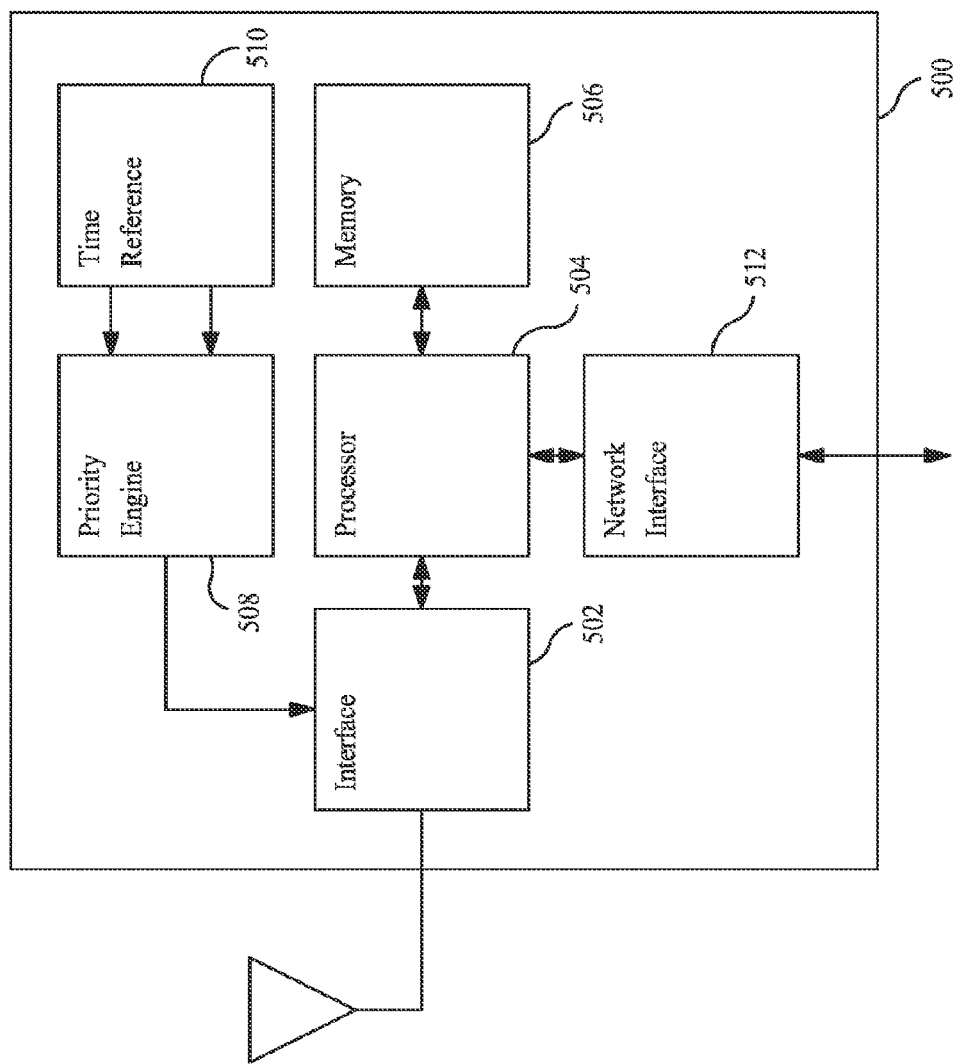
FIG. 5 is a functional block diagram of an exemplary embodiment of a wireless network apparatus useful for implementing various of the methods of the present invention.

FIG. 5 illustrates one exemplary embodiment of a network entity 500 configured in accordance with the present invention. The network entity may be a stand-alone entity, or be incorporated with other network entities (e.g., a base station, a base station controller, a radio access network controller, etc.).

As shown in FIG. 5, the network entity 500 generally includes a wireless (e.g., cellular) interface 502 for interfacing with cellular devices, a processor 504, and a storage apparatus 506. The cellular interface is shown as a wireless cellular interface configured for communication with one or more mobile devices, although other configurations and functionalities may be substituted. For example, in alternate embodiments, the cellular interface may be a wireline communication to a base station, where the base station is in communication with the mobile device.

The cellular interface 502 of the apparatus 500 shown in FIG. 5 at a high level includes one or more radio transceiver circuits configured to transmit and receive data via radio frequency transmissions (RF). Common embodiments of a radio transceiver generally include a modem processor, and one or more antennas. In one exemplary embodiment of the present invention, the radio transceiver is configured in accordance with Long Term Evolution (LTE) radio access technologies. It is recognized that various other implementations of the present invention may be configured for other cellular and/or wireless standards. Common examples of such technologies include: GSM, GPRS, EDGE, WCDMA, CDMA2000, CDMA 1X, CDMA 1X-EVDO, LTE-A, etc. and various combinations thereof.

In one exemplary embodiment, the cellular interface 502 is connected to a priority engine 508, where the priority engine is configured to prioritize one or more network resources according to a likelihood of collision with other network resources. In one exemplary embodiment, the priority engine comprises a computer program which receives a time reference for one or more other networks, and schedule information for the one or more other networks.

In one variant, the time reference information is derived from a Global Positioning System (GPS) receiver master time reference 510. In alternate variants, other time references may be received over a network interface, dedicated interface, internal reference, etc. Furthermore, the network apparatus may be adapted to generate and track one or more additional time references associated with one or more other network time domains. For example, as shown, the network entity can generate both an LTE network time reference and a CDMA 1X network time reference. Other various embodiments may provide localized time reference generation which can be periodically adjusted based on adjustment data (e.g., for example, time stamps exchanged between loosely coupled networks). In other such exemplary implementations, the time reference may be externally provided to the network entity; e.g., where the network entity is connected to other network entities that have a known time reference.

In one variant, the schedule information may be based on known operation of the one or more other networks, or alternately, may be identified to the priority engine 508 via explicit messaging. For example, a peer network entity of one or more other networks may provide the priority engine with e.g., a known paging schedule. In other variants, the schedule information may be known a priori by the priority engine. For example, the priority engine may have been manufactured with scheduling information associated with the one or more other networks, or be updated with such information by e.g., a manufacturing authority, or other supervisory entity. Such updates may be received through the wireless interface(s), or via other interfaces (including e.g., wireline).

During normal operation, the aforementioned cellular interface 502 adjusts communication capabilities with mobile devices, based at least in part on the priority engine 508 input. For example, in one exemplary embodiment, the cellular interface is configured to provide measurement intervals for a mobile device, in low priority time slots associated with that mobile device. In other examples, the cellular interface may be configured to only transmit low data rate, robust data during low priority time slots; or alternately, only control information which can tolerate high loss rates. Still other variations of the present invention are readily recognized by those of ordinary skill in the related arts, given the contents of the present disclosure.

The processor 504 includes one or more processors (or multi-core processor(s)). Additionally, the processor is coupled to processing memory and/or the storage apparatus. Common implementations of the processing subsystem are implemented within signal processors, general processors, network processors, field programmable gate arrays (FPGAs), digital signal processors (DSPs), and any combination of the foregoing. Typical implementations of memory and storage apparatus include Random Access Memory (RAM) and variations thereof (Dynamic RAM, Static RAM, Synchronous RAM, etc.), Flash memory, and Hard Disk Drives (HDD). Moreover, it is further appreciated that one or more memory apparatus may further be configured in various redundancy schemes (e.g., Redundant Arrays of Inexpensive Drives (RAID)), etc.

In one exemplary embodiment, the network entity 500 is further coupled to a wired network infrastructure via a network interface 512. The network interface is generally adapted for use with Ethernet networks, although other suitable network variations include Synchronous Optical Networking (SONET), Asynchronous Transfer Mode (ATM), MoCA, etc. Various forms of physical interface are widely used within the related arts, including for example Ethernet cable (e.g., CAT5), coaxial, fiber optics, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A network apparatus associated with a first wireless network and configurable to prioritize tasks to be performed by a client device when the client device is connected to the first wireless network and to a second wireless network, the network apparatus comprising:
   one or more network interfaces configured to communicate with the client device via the first wireless network;
   one or more processors in communication with the one or more network interfaces; and
   a storage device in communication with the one or more processors and storing computer-executable instructions that, when executed by the one or more processors, cause the network apparatus to:
      determine a time resource during which the client device is scheduled to perform a high priority task via the second wireless network while the client device is connected to the first wireless network; and
      schedule a low priority task to be performed by the client device via the first wireless network during the determined time resource,
      wherein the client device is configured to tune away from the first wireless network to the second wireless network to perform the high priority task via the second wireless network during the determined time resource without notifying the network apparatus.

2. The network apparatus of claim 1, wherein the high priority task comprises monitoring a paging channel of the second wireless network for a paging communication.

3. The network apparatus of claim 1, wherein the network apparatus determines the time resource based at least in part on information derived from a device identifier received from the client device.

4. The network apparatus of claim 3, wherein the device identifier comprises an international mobile subscriber identifier (IMSI) associated with the client device.

5. The network apparatus of claim 1, wherein the low priority task comprises radio monitoring, low priority messaging, or time-insensitive data transmission.

6. The network apparatus of claim 1, wherein the instructions further cause the network apparatus to configure a measurement gap for the client device to measure inter-frequency or inter-RAT (Radio Access Technology) cell quality.

7. The network apparatus of claim 1, wherein the network apparatus determines the time resource based at least in part on (i) a time reference for the second wireless network and/or (ii) schedule information for the second wireless network.

8. The network apparatus of claim 1, wherein the network apparatus determines the time resource based at least in part on scheduling information known a priori to the network apparatus.

9. The network apparatus of claim 1, wherein a basis for priority of tasks comprises: (i) tasks required to keep the client device in communication with the first wireless network, (ii) tasks required to support temporally sensitive or periodic operations and/or (iii) tasks to support user-specified preferences or requirements.

10. The network apparatus of claim 1, wherein tasks are scheduled for the first wireless network and the second wireless network independent of a level of coordination between the first wireless network and the second wireless network.

11. A client device configured for hybrid network operation, the client device comprising:

one or more processors;
one or more wireless interfaces configurable to communicate via at least a first wireless network and a second wireless network; and
a storage device, in communication with the one or more processors and storing computer-executable instructions that, when executed by the one or more processors, cause the client device to:
register with the first wireless network using a first wireless interface of the one or more wireless interfaces;
register with the second wireless network using a second wireless interface of the one or more wireless interfaces;
receive a schedule from the first wireless network for one or more low priority tasks to be performed by the client device via the first wireless network during a time resource;
receive a schedule from the first wireless network for one or more high priority tasks to be performed by the client device via the second wireless network while the client device is connected to the first wireless network during the time resource, the one or more high priority tasks including checking a paging status of the second wireless network; and
tune away from the first wireless network, without notifying a network apparatus of the first wireless network, while maintaining registration with the first wireless network, to check the paging status of the second wireless network during the time resource.

12. The client device of claim 11, wherein execution of the instructions further causes the client device to:
when receiving no pages from the second wireless network:
tune back to the first wireless network, and
resume operation with the first wireless network; and
when receiving at least one page from the second wireless network:
respond to the at least one page, and
notify the network apparatus of the first wireless network to terminate a connection between the first wireless network and the client device, wherein the connection between the first wireless network and the client device is terminated without an abrupt loss of service.

13. The client device of claim 11, wherein execution of the instructions further causes the client device to:
when receiving no pages from the second wireless network:
tune back to the first wireless network, and
resume operation with the first wireless network; and
when receiving at least one page from the second wireless network:
respond to the at least one page without notifying the network apparatus of the first wireless network.

14. The client device of claim 11, wherein the schedule for one or more high priority tasks to be performed by the client device via the second wireless network includes a paging schedule for the client device to monitor a paging channel of the second wireless network.

15. The client device of claim 14, wherein the schedule for one or more low priority tasks to be performed by the client device via the first wireless network allows the client device to maintain communication with the first wireless network when the client device receives one or more high priority communications via the second wireless network.

16. The client device of claim 14, wherein the first wireless network determines a paging schedule for the client device to monitor the paging channel of the second wireless network based at least in part on a device indicator of the client device and a system time of the second wireless network determined based at least in part on a Global Positioning System (GPS) time reference.

17. The client device of claim 11, wherein the first wireless network comprises a Long Term Evolution (LTE) network, and the second wireless network comprises a Code Division Multiple Access (CDMA) network or a Global System for Mobile Communications (GSM) network.

18. A method for a network apparatus associated with a first wireless network and configurable to prioritize tasks to be performed by a client device when the client device is connected to the first wireless network and to a second wireless network, the method comprising:
by the network apparatus:
communicating with the client device via the first wireless network via one or more network interfaces;
determining a time resource during which the client device will be scheduled to perform a high priority task via the second wireless network while the client device is connected to the first wireless network; and
scheduling a low priority task to be performed by the client device via the first wireless network during the determined time resource,
wherein the client device tunes away from the first wireless network to the second wireless network to perform the high priority task via the second wireless network during the determined time resource without notifying the network apparatus.

19. The method of claim 18, wherein the client device performs the low priority task during the determined time resource.

20. The method of claim 19, wherein the low priority task comprises transfer of control data from the client device to the network apparatus.

* * * * *